(12) United States Patent
Hilton et al.

(10) Patent No.: US 9,130,818 B2
(45) Date of Patent: Sep. 8, 2015

(54) UNIFIED SYSTEMS OF NETWORK TOOL OPTIMIZERS AND RELATED METHODS

(71) Applicants: Gregory S. Hilton, Austin, TX (US);
Andrew M. Spooner, Austin, TX (US);
Franz J. Weller, Austin, TX (US);
Patricia A. Abkowitz, Austin, TX (US);
Ronald A. Pleshek, Austin, TX (US);
Richard G. Jeske, Georgetown, TX (US); Keith E. Cheney, Austin, TX (US); Charles A. Webb, III, Austin, TX (US); Scott A. Harper, Cedar Park, TX (US)

(72) Inventors: Gregory S. Hilton, Austin, TX (US);
Andrew M. Spooner, Austin, TX (US);
Franz J. Weller, Austin, TX (US);
Patricia A. Abkowitz, Austin, TX (US);
Ronald A. Pleshek, Austin, TX (US);
Richard G. Jeske, Georgetown, TX (US); Keith E. Cheney, Austin, TX (US); Charles A. Webb, III, Austin, TX (US); Scott A. Harper, Cedar Park, TX (US)

(73) Assignee: Anue Systems, Inc., Austin, TX (US)

( * ) Notice: Subject to any disclaimer, the term of this patent is extended or adjusted under 35 U.S.C. 154(b) by 132 days.

(21) Appl. No.: 13/792,407

(22) Filed: Mar. 11, 2013

(65) Prior Publication Data

US 2014/0254396 A1  Sep. 11, 2014

(51) Int. Cl.
*H04L 12/701* (2013.01)
*H04L 12/931* (2013.01)
*H04L 12/24* (2006.01)
*H04L 12/26* (2006.01)

(52) U.S. Cl.
CPC ............ *H04L 45/00* (2013.01); *H04L 41/0893* (2013.01); *H04L 49/00* (2013.01); *H04L 12/26* (2013.01); *H04L 43/00* (2013.01)

(58) Field of Classification Search
CPC .. H04L 12/26; H04L 2012/5628; H04L 43/00
USPC ........... 370/241–250, 254–255; 709/201–203
See application file for complete search history.

(56) References Cited

U.S. PATENT DOCUMENTS 6,278,694 B1   8/2001  Wolf et al.
6,339,587 B1 *  1/2002  Mishra .......................... 370/255

(Continued)

OTHER PUBLICATIONS

Parulkar et al., "An Architecture for Monitoring, Visualization and Control of Gigabit Networks", Department of Computer Science, Aug. 8, 1997, 21 pgs.

*Primary Examiner* — Warner Wong
(74) *Attorney, Agent, or Firm* — Egan, Peterman, & Enders, LLP

(57) ABSTRACT

Systems and methods are disclosed for unified systems of network tool optimizers (NTOs). A NTO supervisor device controls switch fabric circuitry to interconnect a plurality of NTO member devices so that packets received at a source port for one NTO member device can be output to a destination port for a different NTO member device. The NTO supervisor device is further configured to analyze filters for the NTO member devices and to generate filter rules for forwarding packets among the various NTO member devices using the switch fabric circuitry. Further, additional secondary NTO supervisor devices can also be included within the unified NTO system to further expand the system. As such, a plurality of NTO member devices are managed and controlled by one or more NTO supervisor devices to form a highly scalable and efficient unified NTO system.

26 Claims, 8 Drawing Sheets

(56) References Cited

U.S. PATENT DOCUMENTS

| | | |
|---|---|---|
| 6,571,358 B1* | 5/2003 | Culotta et al. ............... 714/33 |
| 6,789,117 B1 | 9/2004 | Joiner et al. |
| 7,149,189 B2 | 12/2006 | Huntington et al. |
| 7,702,806 B2 | 4/2010 | Gil et al. |
| 7,711,751 B2 | 5/2010 | Kelley et al. |
| 8,018,943 B1 | 9/2011 | Pleshek et al. |
| 8,086,666 B2 | 12/2011 | Lo |
| 8,098,677 B1 | 1/2012 | Pleshek et al. |
| 8,103,763 B2 | 1/2012 | Slepov et al. |
| 8,103,764 B2* | 1/2012 | Aviles ........................ 709/224 |
| 2004/0003094 A1* | 1/2004 | See ............................. 709/227 |
| 2005/0198278 A1* | 9/2005 | Setogawa et al. ............ 709/224 |
| 2006/0067216 A1* | 3/2006 | Lalonde et al. .............. 370/230 |
| 2006/0253566 A1* | 11/2006 | Stassinopoulos et al. .... 709/224 |
| 2006/0280207 A1* | 12/2006 | Guarini et al. ............... 370/524 |
| 2010/0315972 A1* | 12/2010 | Plotnik et al. ............... 370/254 |
| 2011/0044182 A1* | 2/2011 | Herriott et al. .............. 370/252 |
| 2011/0087772 A1* | 4/2011 | Breslin et al. ............... 709/224 |
| 2012/0079107 A1* | 3/2012 | Williams et al. ............. 709/224 |
| 2013/0215748 A1* | 8/2013 | Ratakonda et al. .......... 370/235 |
| 2013/0232240 A1 | 9/2013 | Purusothaman |

* cited by examiner

US 9,130,818 B2

UNIFIED SYSTEMS OF NETWORK TOOL OPTIMIZERS AND RELATED METHODS

TECHNICAL FIELD OF THE INVENTION

This invention relates to packet forwarding and, more particularly, to forwarding packets from network sources to destination tools for network analysis purposes.

BACKGROUND

Packet processing systems utilize network routing or switch integrated circuits (ICs) to forward packets from input or ingress ports to output or egress ports. In particular, these integrated circuits are able to forward network packets from an ingress port to one or more egress ports based upon packet filter rules and information contained within selected fields within the input packets. This information can include user identification information, such as source and destination address information, as well as other information.

For network testing, packet traffic is often monitored from numerous network nodes. This monitored network packet traffic is then forwarded to one or more network analyzer tools to analyze various network related items, such as whether or not intrusions are occurring within a network. Prior solutions have used a network tool optimizer (NTO) to receive one or more packet streams from network sources at source ports for the NTO device, to process these source packets based upon packet filter rules defined within the NTO, and to forward them to one or more network analyzer tools connected to output ports for the NTO. As networks have increased in size and complexity, however, it has become difficult for an NTO to handle packet forwarding for network analysis purposes.

SUMMARY OF THE INVENTION

Systems and methods are disclosed for unified systems of network tool optimizers (NTOs). A NTO supervisor device controls switch fabric circuitry to interconnect a plurality of NTO member devices so that packets received at a source port for one NTO member device can be output to a destination port for a different NTO member device. The NTO supervisor device is further configured to analyze filters for the NTO member devices and to generate filter rules for forwarding packets among the various NTO member devices using the switch fabric circuitry. Further, additional secondary NTO supervisor devices can also be included within the unified NTO system to further expand the system. As such, a plurality of NTO member devices are managed and controlled by one or more NTO supervisor devices to form a highly scalable and efficient unified NTO system where packet traffic can be forwarded from a selected source port within the unified NTO system to a selected destination port within the unified NTO system, including to and from source/tool ports provided within the NTO supervisor devices themselves. Different features and variations can be implemented, as desired, and related systems and methods can be utilized, as well.

For one embodiment, a system is disclosed for unified operation of multiple network tool optimizer (NTO) devices including a first network tool optimizer (NTO) member device including at least one source port and at least one interconnect port, a second NTO member device including at least one destination port and at least one interconnect port, switch fabric circuitry coupled to the interconnect ports for the first and second NTO member devices, and an NTO supervisor device configured to control the switch fabric circuitry to receive packets from the first NTO member device and to forward the received packets to the second NTO member device. The packets are associated with the at least one source port on the first NTO member device and being output to the at least one destination port on the second NTO member device. And the NTO supervisor device is further configured to manage the NTO member devices and the switch fabric circuitry to form a unified NTO system.

In other embodiments, the system can include a first packet filter associated with the first NTO member device having filter rules that determine how packets are forwarded within the first NTO member device and include a second packet filter associated with the second NTO member device having filter rules that determine how packets are forwarded within the second NTO member device. Further, the NTO supervisor device can be further configured to manage the filter rules for the first packet filter and the second packet filter. Still further, the switch fabric circuitry can be internal to the NTO supervisor device, and the NTO supervisor device can include a plurality of interconnect ports coupled to the interconnect ports for the first and second NTO member devices. The switch fabric circuitry can also be external to the NTO supervisor device.

In further embodiments, the NTO supervisor device can be configured to provide a user interface, and the user interface can be configured to allow a user to define one or more packet filters for the unified NTO system. The NTO supervisor device can also be further configured to automatically detect an NTO device coupled within a network including the NTO supervisor and to register the NTO device as a member device within the unified NTO system. Further, the NTO supervisor device can be further configured to generate filter rules for one or more NTO member devices within the unified NTO system and to push the filter rules to the one or more NTO member devices. The NTO supervisor device can also be further configured to generate port configurations for one or more NTO member devices within the unified NTO system and to push the port configurations to the one or more NTO member devices. Still further, the NTO member devices can be configured to automatically provide configuration information to the NTO supervisor device. Also, the NTO supervisor device can be further configured to store configuration information associated with the NTO member devices and to use the stored configuration information to at least in part determine how packets are forwarded within the unified NTO system between the NTO member devices.

In still further embodiments, the system further include at least one secondary NTO supervisor device coupled to the NTO supervisor device and managed by the NTO supervisor device to extend the unified NTO system, the secondary NTO supervisor device being configured to control additional switch fabric circuitry to receive packets from the NTO supervisor device and to forward the received packets to one or more additional NTO member devices coupled to the secondary NTO supervisor device. In additional embodiments, the system can be configured such that at least one of a VLAN (virtual local area network) table, an L3 (network layer 3) table, or an L2 (network layer 2) table is utilized to define a packet filter within the first and second NTO member devices. Still further, the system can be configured such that the at least one destination port is determined only by one or more packet filters defined within the first NTO member device as an initial ingress NTO member device for the packets associated with the at least one source port.

For another embodiment, a method is disclosed for unified operation of multiple network tool optimizer (NTO) devices including receiving packets with a first network tool optimizer (NTO) device, receiving packets with a second network tool optimizer (NTO) device, receiving with switch fabric circuitry a plurality of packets from the first NTO member device where the plurality of packets are associated with at least one source port on the first NTO member device, utilizing the switch fabric circuitry to forward the plurality of packets to the second NTO member device, outputting the plurality of packets to at least one destination port on the second NTO member device, controlling the switch fabric circuitry using an NTO supervisor device, and managing the NTO member devices and the switch fabric circuitry with the NTO supervisor device to form a unified NTO system.

In other embodiments, the method can include using filter rules for a first packet filter within the first NTO member device to determine how packets are forwarded within the first NTO member device and using filter rules for a second packet filter within the second NTO member device to determine how packets are forwarded within the second NTO member device. Further, the method can include utilizing the NTO supervisor device to manage the filter rules for the first packet filter and the second packet filter. Still further, the method can include utilizing switch fabric circuitry internal to the NTO supervisor device to forward packets from the first NTO device to the second NTO device. The method can also include utilizing switch fabric circuitry external to the NTO supervisor device to forward packets from the first NTO device to the second NTO device.

In further embodiments, the method can include allowing a user to define one or more packet filters for the unified NTO system through a user interface for the NTO supervisor device. The method can also include utilizing the NTO supervisor device to automatically detect an NTO device coupled within a network including the NTO supervisor and to register the NTO device as member device within the NTO system. Further, the method can include utilizing the NTO supervisor device to generate filter rules for one or more NTO member devices within the unified NTO system and to push the filter rules to the one or more NTO member devices. The method can also include utilizing the NTO supervisor device to generate port configurations for one or more NTO member devices within the unified NTO system and to push the port configurations to the one or more NTO member devices. Still further, the method can include automatically providing configuration information from the NTO member devices to the NTO supervisor device. Also, the method can include storing configuration information associated with the NTO member devices and using the stored configuration information to at least in part determine how packets are forwarded within the unified NTO system between the NTO member devices.

In still further embodiments, the method can further include managing a secondary NTO supervisor device with the NTO supervisor device to extend the unified NTO system and utilizing the secondary NTO supervisor device to receive packets from the first NTO supervisor device and to forward the received packets to one or more additional NTO member devices coupled to the secondary NTO supervisor device. In additional embodiments, the method can include utilizing at least one of a VLAN (virtual local area network) table, an L3 (network layer 3) table, or an L2 (network layer 2) table to define a packet filter within the first and second NTO member devices. Still further, the method can include determining the at least one destination port based only upon one or more packet filters defined within the first NTO member device as an initial ingress NTO member device for the packets associated with the at least one source port.

Different features and variations can be implemented, as desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1:
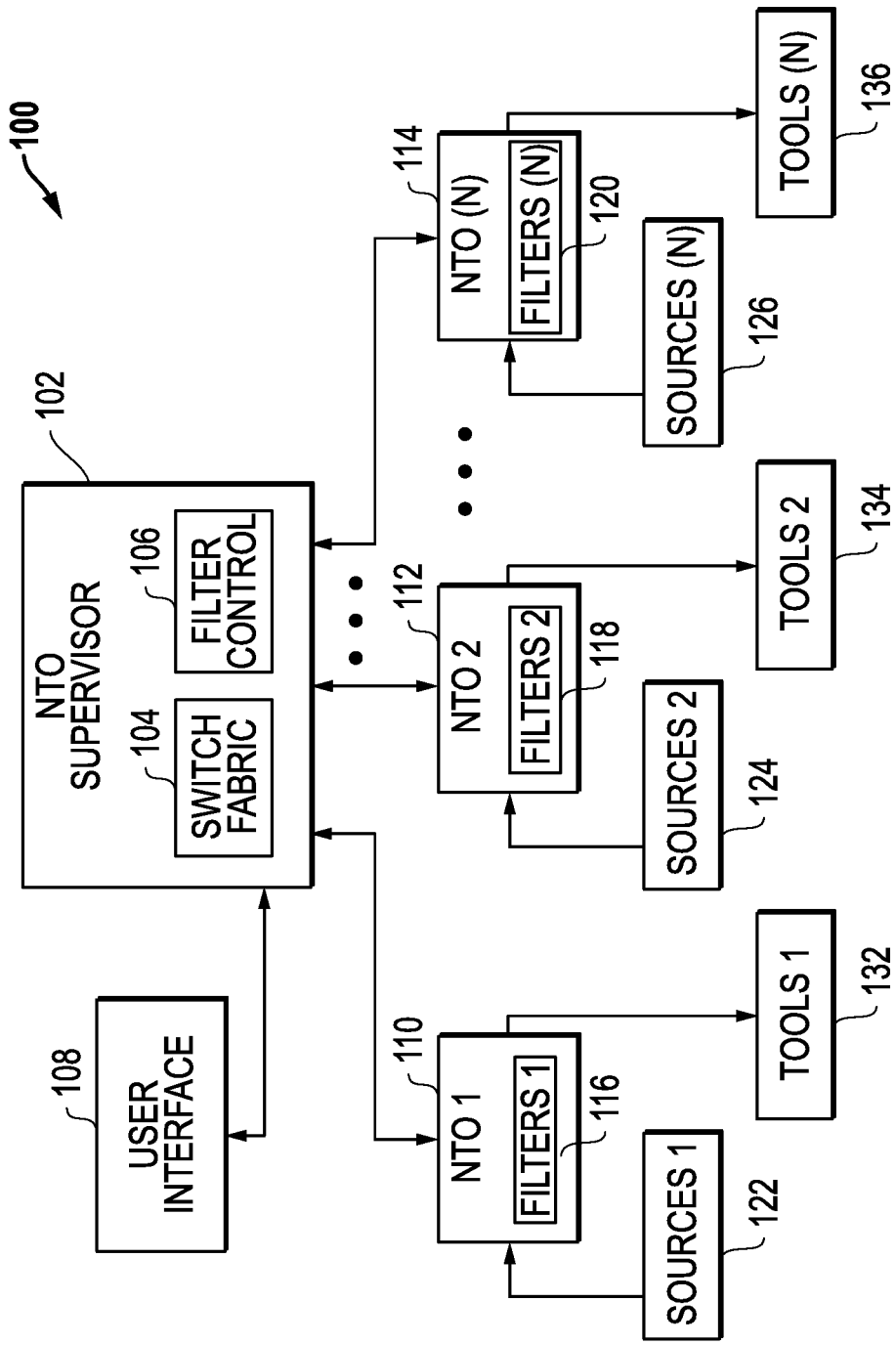
FIG. 1 is a block diagram of an embodiment for a unified NTO (network tool optimizer) system having a NTO supervisor and a plurality of NTO members.

Systems and methods are disclosed for unified systems of network tool optimizers (NTOs). A NTO supervisor device controls switch fabric circuitry to interconnect a plurality of NTO member devices so that packets received at a source port for one NTO member device can be output to a destination port for a different NTO member device. The NTO supervisor device is further configured to analyze filters for the NTO member devices and to generate filter rules for forwarding packets among the various NTO member devices using the switch fabric circuitry. Further, additional secondary NTO supervisor devices can also be included within the unified NTO system to further expand the system. As such, a plurality of NTO member devices are managed and controlled by one or more NTO supervisor devices to form a highly scalable and efficient unified NTO system where packet traffic can be forwarded from a selected source port within the unified NTO system to a selected destination port within the unified NTO system, including to and from source/tool ports provided within the NTO supervisor devices themselves. Different features and variations can be implemented, as desired, and related systems and methods can be utilized, as well.

As described herein, the disclosed embodiments provide systems and methods for organizing and connecting a collection of network tool optimizer (NTO) elements so as to provide a large, virtual or unified NTO system. The unified NTO system can include, for example, a plurality of NTO member nodes or devices, where each NTO member node includes a plurality of communication ports configured to send and receive network packets, such as UDP (user datagram protocol) packets and/or other types of packets. The NTO member nodes can also include one or more packet filters, as described herein, which utilize filter rules to determine how packets are forwarded from ingress ports to egress ports for the NTO member devices. The communication ports for the NTO members can be configured as network source ports for receiving ingress packets (e.g., from one or more monitored network communication paths) or as destination tool ports for outputting egress packets (e.g., to one or more network analyzer tools, such as traffic analyzers, logs, etc.). Further, communication ports for the NTO members can be configured as interconnection fabric ports that are utilized to facilitate high speed communication of packets between an NTO supervisor and NTO member devices.

The NTO supervisor device is used to configure and manage the unified NTO system. From a hierarchical topology perspective, the supervisor NTO node or device resides in an organization layer that is above the layer associated with the NTO member nodes that are within the virtual or unified NTO system. Using the NTO supervisor, a user can be provided with a consolidated user interface, such as a graphical user interface (GUI), through which a number of administrative and NTO system control tasks can be performed. For example, using the consolidated GUI interface, a user can generate packet filters for NTO member devices and/or modify these filters to provide for desired forwarding of packets between source ingress ports and destination egress ports for the various NTO members of the unified NTO system. Further, automated configuration and control functions can be implemented by the NTO supervisor, as well. Once packet filters are created, the NTO supervisor device can be configured to analyze these packet filters, to generate associated packet filter rules, and to push these packet filter rules from the NTO supervisor device to the associated NTO member devices. The filter rules are then utilized by the NTO member devices to cause packets to be forwarded throughout the unified NTO system according to the filters that have been defined for the unified NTO system.

With respect to registration and configuration of NTO members, it is noted that the NTO supervisor can be configured to locate new NTO members within the system and/or the NTO members can be configured to inform the NTO supervisor of their presence. For example, upon connection of an NTO member within the infrastructure of the NTO system, the NTO member can be configured to automatically inform the NTO supervisor of its existence and its current packet filter rules, so as to provide the NTO supervisor with an initial set of filter rules for the NTO member. Further, the NTO supervisor can be configured to store a copy of the NTO member filter rules, and/or the NTO supervisor could be configured to maintain a link or pointer to the NTO member filter rules that are resident on the NTO member. Further, the NTO supervisor device can also be configured to automatically conduct identification and registration of new NTO members, if desired. And the NTO supervisor could also be configured to automatically conduct this port configuration for NTO members, if desired. Still further, if desired, the consolidated GUI interface could be utilized by a user to manually identify and register NTO members within the unified or virtual NTO system. Similarly, the consolidated GUI interface could also be utilized by user to manually configure communication ports for the NTO members within the unified or virtual NTO system. Variations could also be implemented, as desired, while still forming a unified NTO system according to the embodiments described herein.

Figure 2:
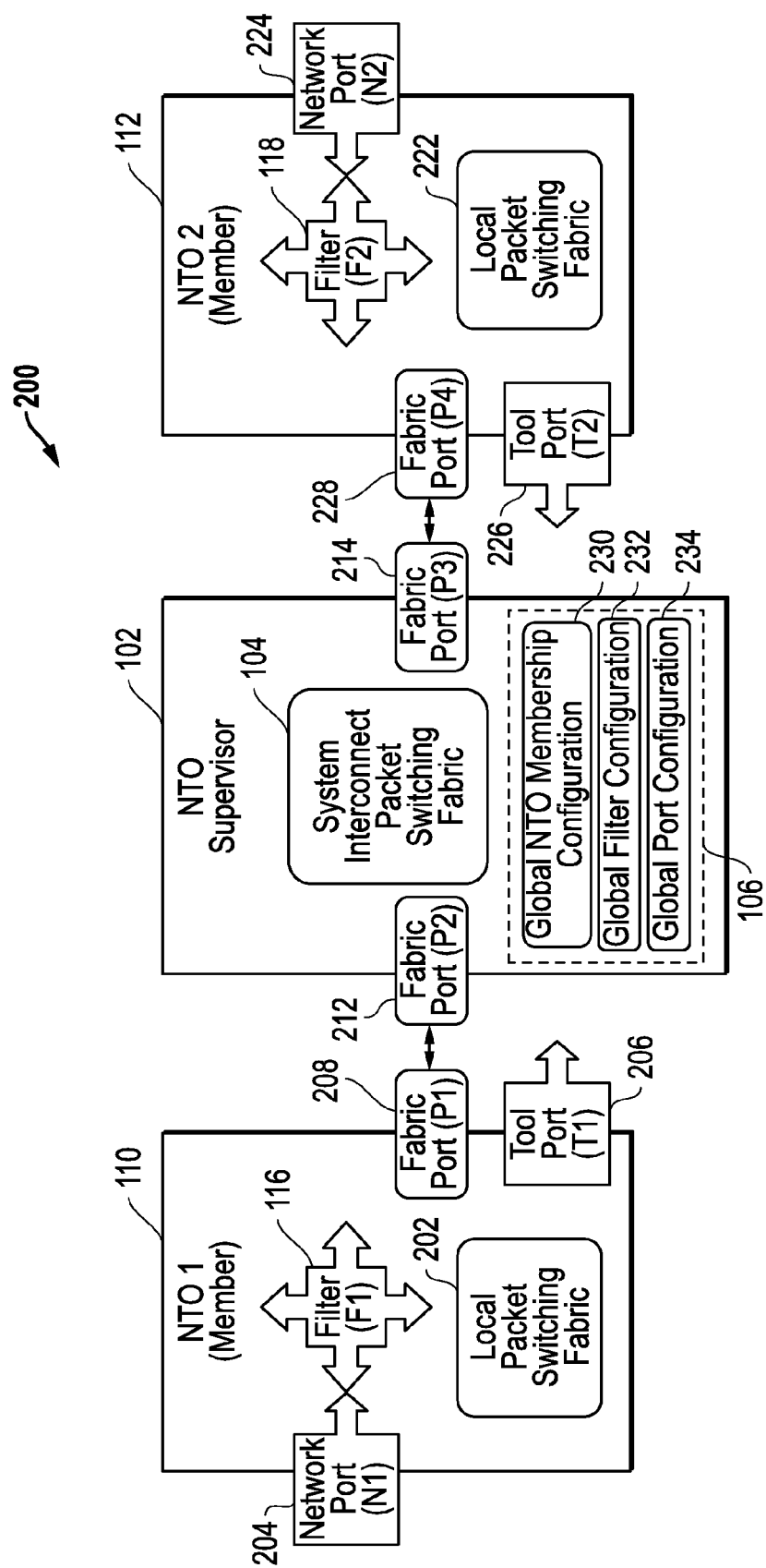
FIG. 2 is a block diagram of an embodiment of a unified NTO system including an NTO supervisor and two NTO members.
Figure 3:
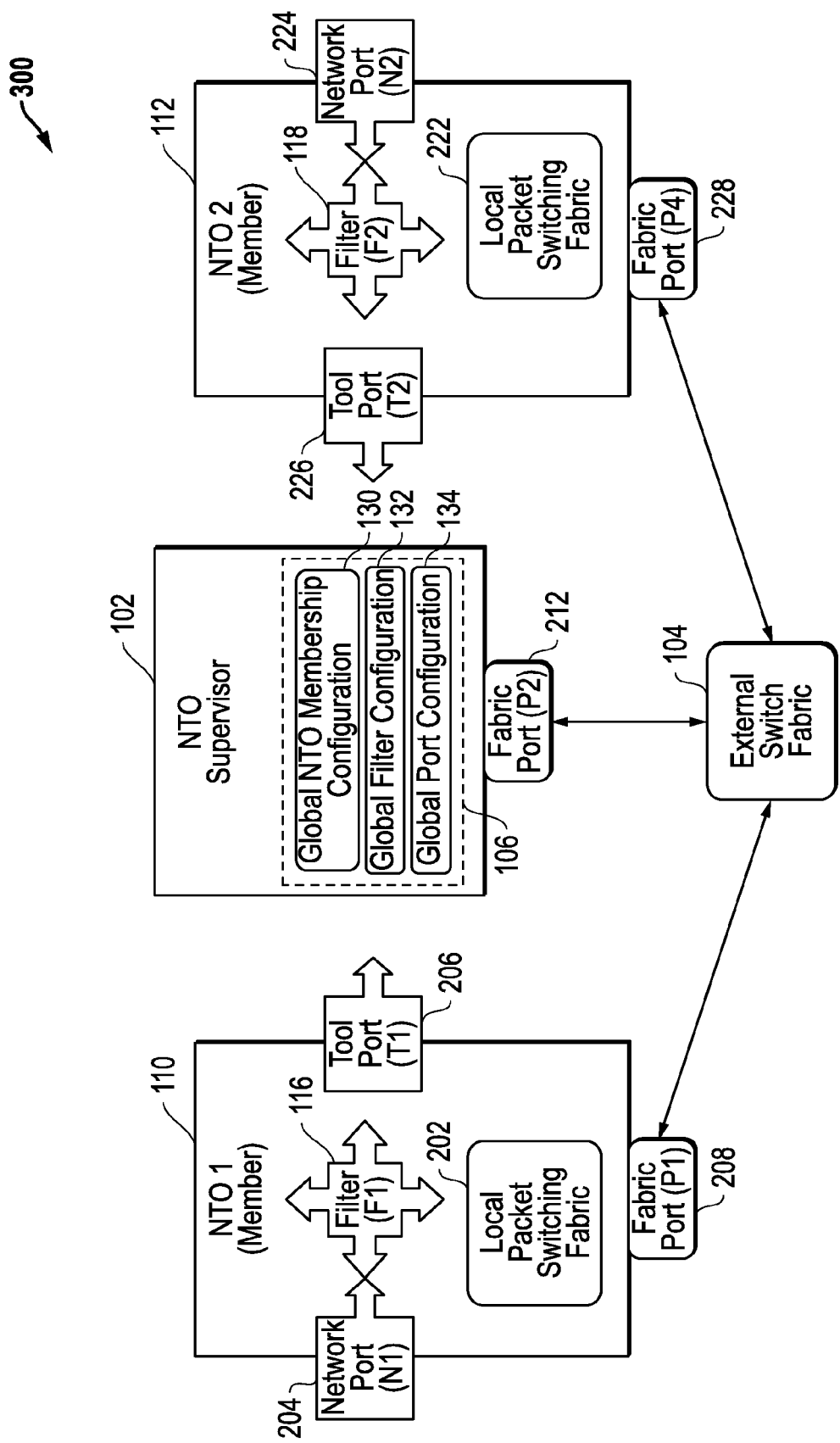
FIG. 3 is a block diagram of an embodiment for an NTO supervisor utilizing an external packet switch.
Figure 4:
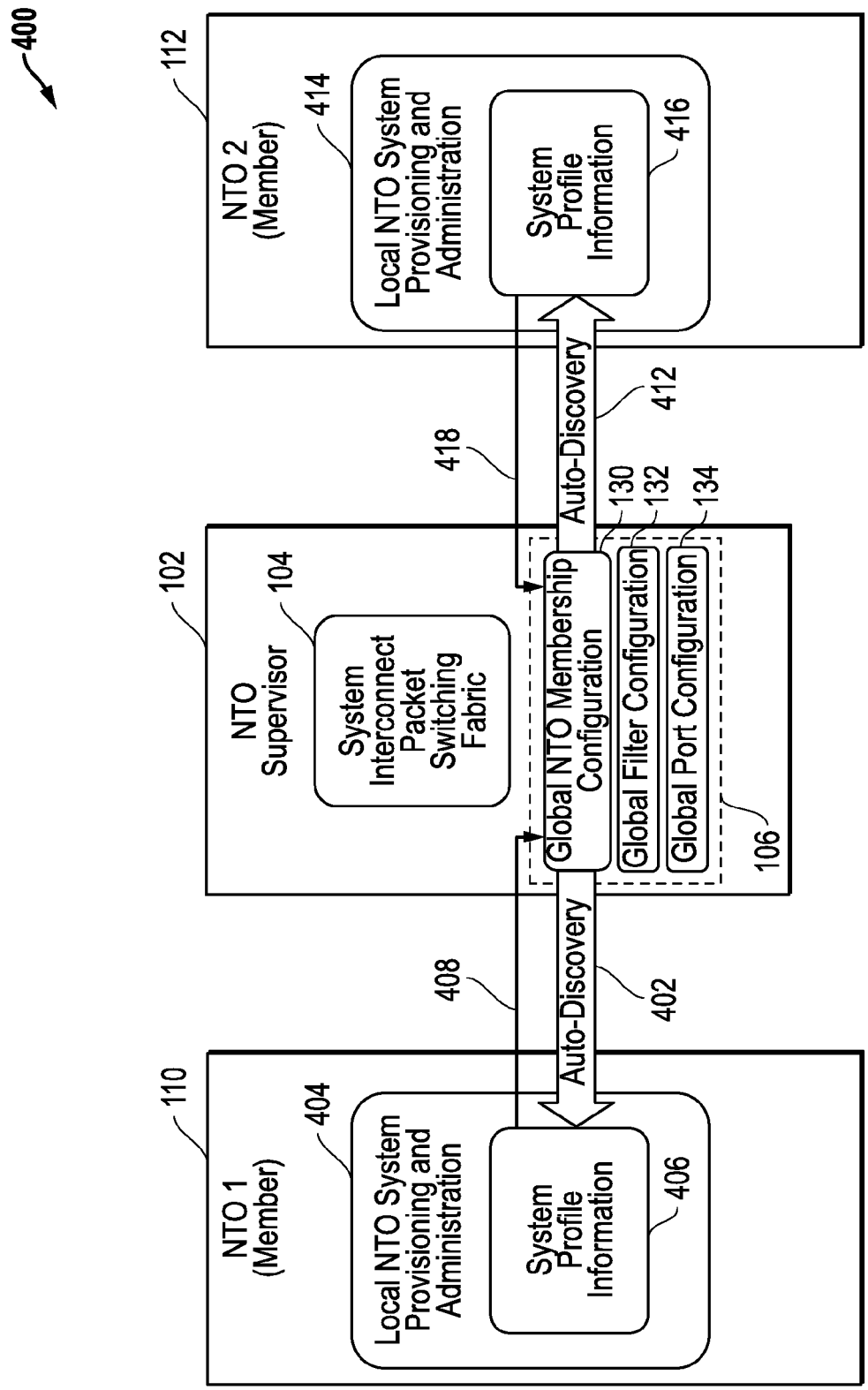
FIG. 4 is a block diagram of an embodiment 400 for NTO membership configuration by an NTO supervisor.
Figure 5:
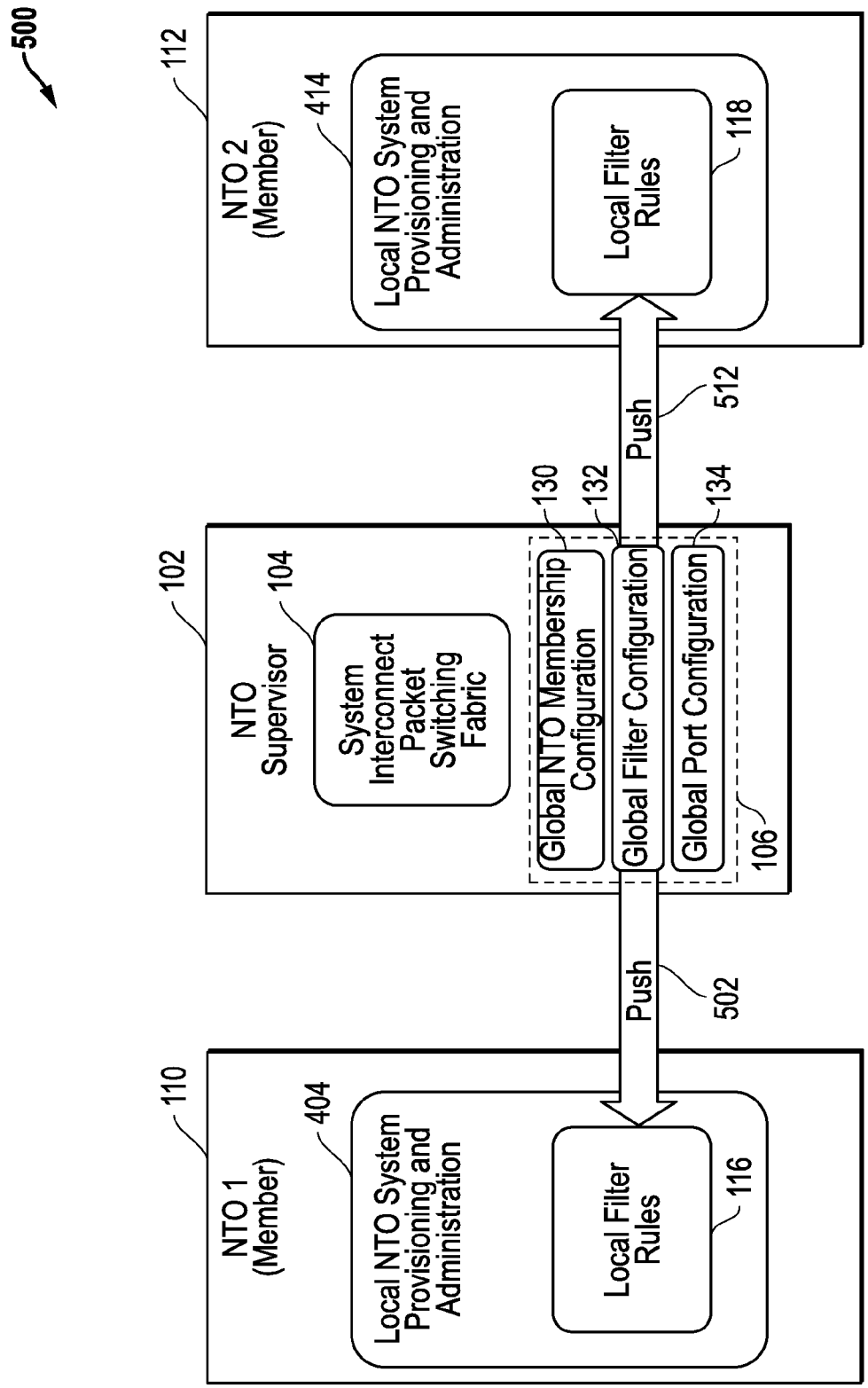
FIG. 5 is a block diagram of an embodiment for NTO filter configuration by an NTO supervisor.
Figure 6:
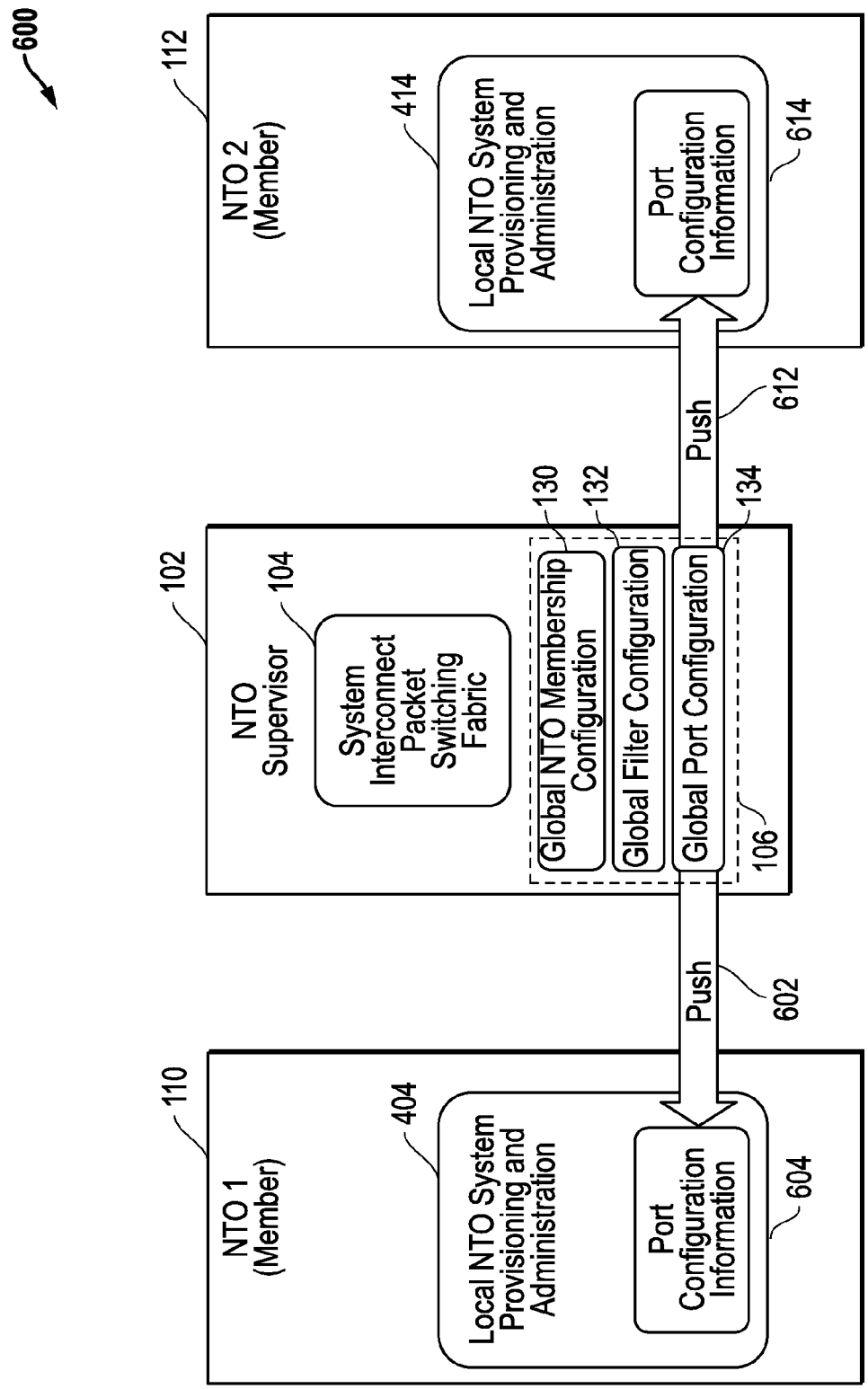
FIG. 6 is a block diagram of an embodiment for NTO port configuration by the NTO supervisor.
Figure 7:
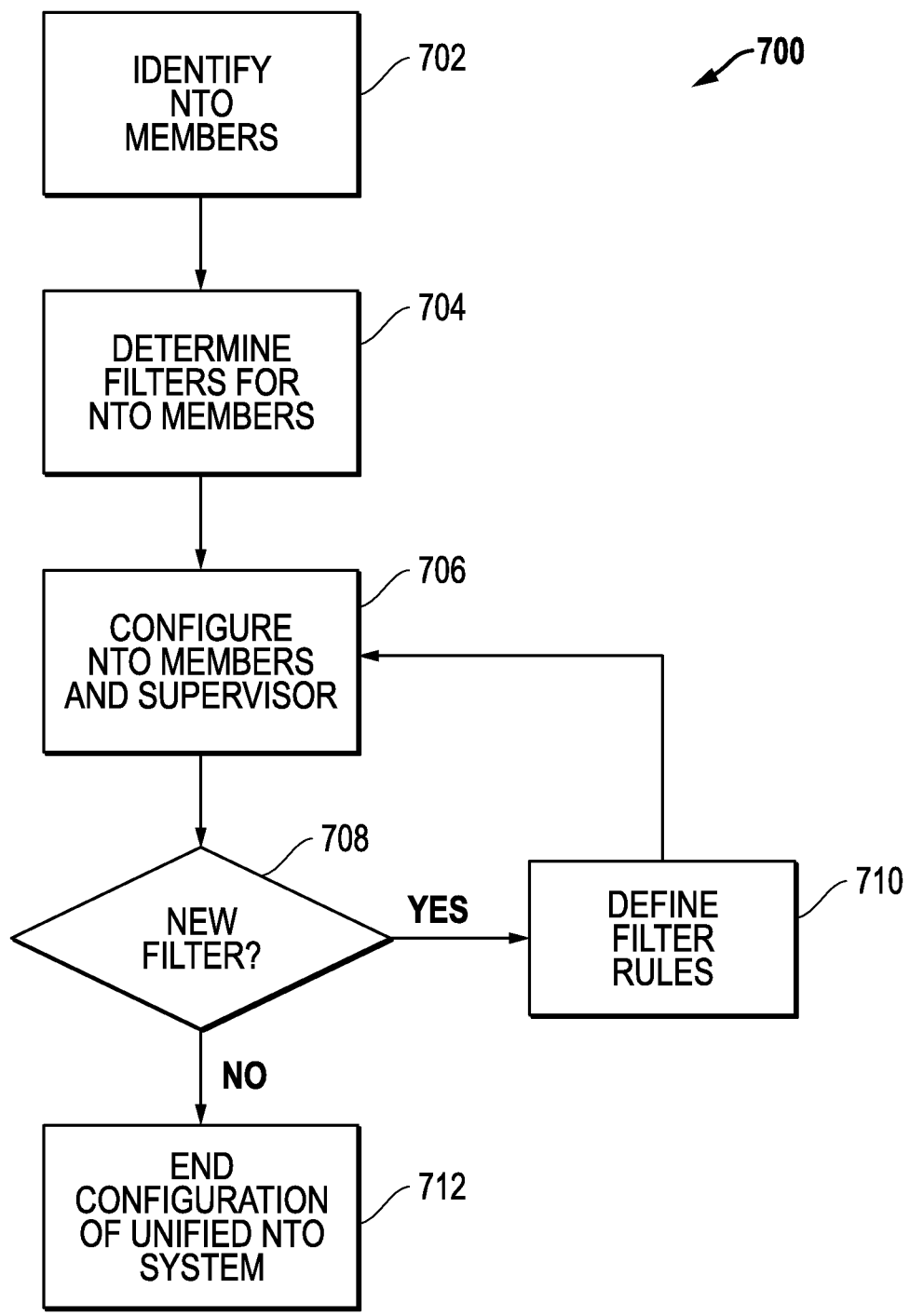
FIG. 7 is a process flow diagram of an embodiment for configuration of a unified NTO system.
Figure 8:
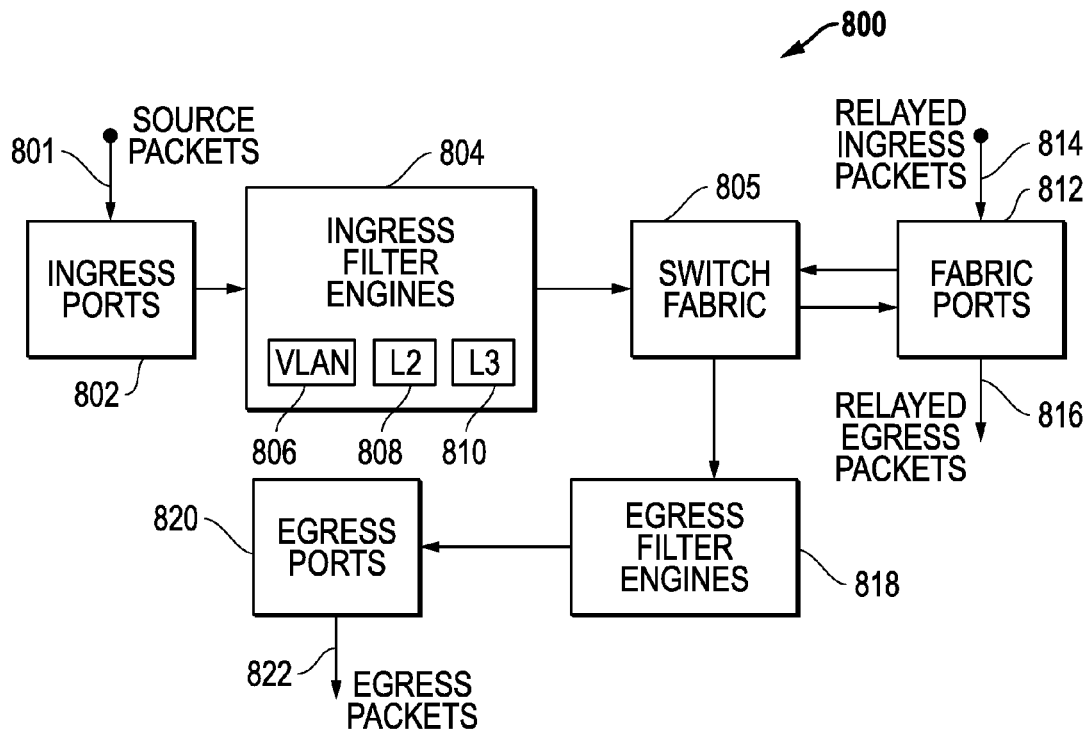
FIG. 8 is a block diagram of an embodiment for an NTO member.
Figure 9:
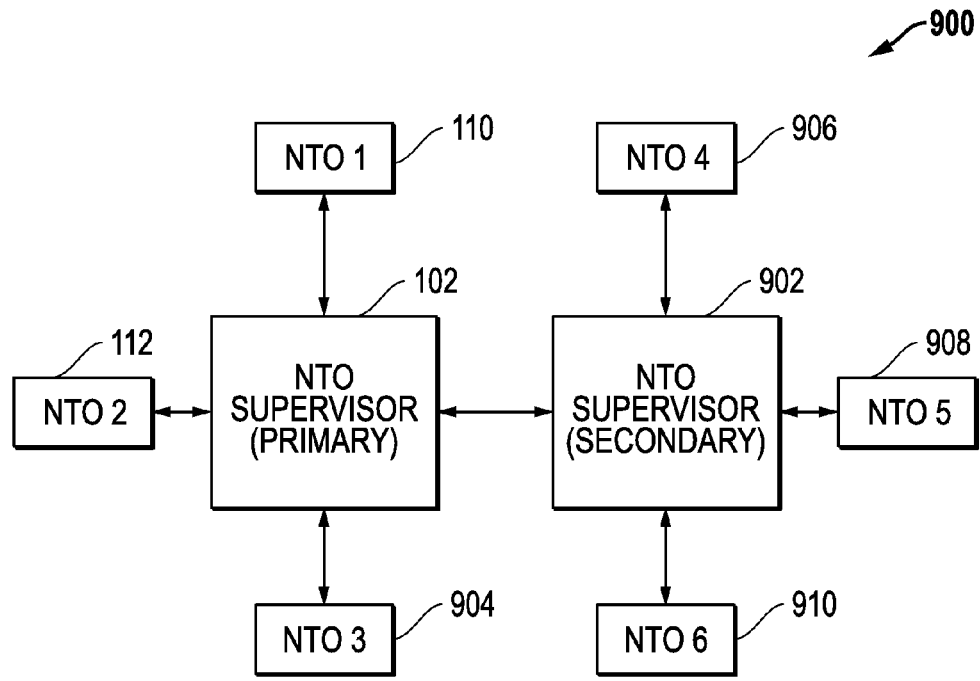
FIG. 9 is a block diagram of an embodiment for a unified NTO system that includes multiple NTO supervisors.

Example embodiments are now described with respect to the figures. FIGS. 1-3 provide block diagrams of embodiments for unified NTO systems. FIGS. 4-6 provide block diagrams of embodiments for configuration of NTO members, filters, and ports for unified NTO systems. FIG. 7 provides a process flow diagram of an embodiment for configuration of a unified NTO system. FIG. 8 provides a block diagram of an embodiment for an NTO member. And FIG. 9 provides a block diagram of an embodiment for a unified NTO system having multiple NTO supervisors.

FIG. 1 is a block diagram of an embodiment 100 for a unified system for a plurality of network tool optimizer (NTO) devices. An NTO supervisor device 102 is coupled to multiple NTO member devices 110, 112 . . . 114. The NTO supervisor device 102 includes a switch fabric 104 configured to route packets and communications to and from the NTO member devices 110, 112 . . . 114. The NTO supervisor 102 also includes a filter control block 106, which is configured to configure ports and filters within the NTOs 110, 112 . . . 114 to unify packet forwarding among the NTO members and thereby create a unified multi-NTO system as described herein. Further, a user interface 108 is coupled to the NTO supervisor 102. The user interface 108 can be configured to allow a user to view, modify, manage, and/or define elements of the unified NTO system. It is further noted that a plurality of NTO supervisors could also be utilized to interconnect and manage the unified NTO system, as described further below. As described herein, utilizing one or more NTO supervisor devices, a plurality of NTO member devices are managed and controlled to form a unified NTO system where packet traffic can be forwarded from any source port within the unified NTO system to any tool port within the unified NTO system, if desired, including to and from any source/tool ports provided within the NTO supervisor devices themselves. Other variations could also be implemented, as desired.

With respect to the NTO members depicted for embodiment 100, the first NTO member (NTO1) 110 is coupled to receive packets from a first set of one or more sources (SOURCES1) 122 and to forward packets to a first set of one or more network analyzer tools (TOOLS1) 132 according to a first set of filter rules (FILTERS1) 116. The second NTO member (NTO2) 112 is coupled to receive packets from a second set of one or more sources (SOURCES2) 124 and to forward packets to a second set of set of one or more network analyzer tools (TOOLS2) 134 according to a second set of filter rules (FILTERS2) 118. The Nth NTO member (NTO (N)) 114 is coupled to receive packets from an Nth set of one or more sources (SOURCES(N)) 126 and to forward packets to an Nth set of set of one or more network analyzer tools (TOOLS(N)) 136 according to an Nth set of filter rules (FILTERS(N)) 120.

FIG. 2 is a block diagram of an embodiment 200 of a unified NTO system including an NTO supervisor device 102 and two NTO member devices 110 and 112. As described herein, the NTO member devices include one or more input or ingress ports for receiving network source packets that are forwarded to one or more output or egress ports (e.g., for receipt by one or more destination tools) or to one or more interconnect fabric ports (e.g., for receipt by a NTO supervisor device) according to one or more sets of filter rules. As also described herein, the NTO supervisor includes a plurality of fabric ports configured to receive packets from and/or send packets to NTO member nodes. Further the NTO supervisor includes filter control block 106 that operates to configure the filters and/or ports within the NTO members so that packet forwarding is unified among the different NTO members. As described herein, this unification allows for ingress packets received at one NTO member to be forwarded through the NTO supervisor to another NTO member for output to an egress port for the other NTO member.

Looking back to FIG. 2, for the embodiment 200 depicted, the first NTO member (NTO1) 110 is configured to receive ingress source packets at a first network port (N1) 204. These ingress network source packets are then forwarded to egress ports, such as a first tool port (T1) 206, according to forwarding rules defined for a first filter (F1) 116. The forwarding rules defined for the first filter (F1) 116 may also cause one or more of the received ingress source packets to be forwarded to an interconnect fabric port, such as the first fabric port (P1) 208, for receipt by the NTO supervisor 102. The first NTO member (NTO1) 110 also includes a local packet switching fabric 202 that forwards ingress packets to egress ports and/or fabric ports based upon the filter rules, such as defined within the first filter (F1) 116. Similarly, for the embodiment depicted, the second NTO member (NTO1) 112 is configured to receive ingress source packets at a second network port (N2) 224. These ingress network source packets are then forwarded to egress ports, such as a second tool port (T2) 226, according to forwarding rules defined for a second filter (F2) 118. The forwarding rules defined for the second filter (F2) 118 may also cause one or more of the received ingress source packets to be forwarded to a fabric port, such as the fourth fabric port (F4) 228, for receipt by the NTO supervisor 102. The second NTO member (NTO2) 112 also includes a local packet switching fabric 222 that forwards ingress packets to egress ports and/or fabric ports based upon the filter rules, such as defined within the second filter (F2) 118. Further, it is noted that an interconnection fabric port could be implemented as a bridged Ethernet port, if desired, and forwarding rules could further be provided for this bridged Ethernet port when used as an egress interconnection port. An egress interconnection port could also be implemented using a port configured to utilize a protocol that specifies egress packet forwarding information. Other implementations could also be utilized, as desired.

The NTO supervisor 102 includes a plurality of interconnect fabric ports, such as second fabric port (P2) 212 and third fabric port (P3) 214, which are configured to receive packets from and/or send packets to NTO member devices. As depicted, the second fabric port (P2) 212 is configured to receive packets from and send packets to the first fabric port (P1) 208 for the first NTO member (NTO1) 110. The third fabric port (P3) 214 is configured to receive packets from and send packets to the fourth fabric port (P4) 118 for the second NTO member (NTO2) 112. The NTO supervisor also includes a system interconnect packet switching fabric 104 that forwards packets received from the NTO members according to the configurations stored within the filter control block 106. As described herein, the filter control block 106 can be configured to include global NTO membership configuration block 230, global filter configuration block 232, and global port configuration block 234, which are described in further detail with respect to FIGS. 4-6 below. Further, it is noted that the NTO supervisor 102 could be implemented to include one or more source ports, one or more tool ports, one or more fabric ports, and/or one or more filters, if desired. For example, if a plurality of NTO devices, such as NTO member devices described herein are provided within a network, one or more of the NTO devices can be configured as NTO supervisor devices, and one or more of the NTO devices can be configured as NTO member devices, as desired. Other variations could also be implemented as desired.

It is noted that the packet switching fabric 104 for the NTO supervisor 102 could also be located externally to the NTO supervisor 102, if desired. For example, the NTO supervisor 102 could be configured to include the filter control block 106. The packet switching fabric 104 could then be configured as an external device that is coupled to and controlled by the NTO supervisor 102. The external packet switching fabric 104 could also be coupled to the NTO members, if desired, such that packets communicated between the NTO supervisor 102 and the NTO members would travel through the external packet switching fabric 104.

FIG. 3 is a block diagram of an embodiment 300 having an external switch fabric 104. The embodiment 300 is similar to embodiment 200 of FIG. 2 except the first fabric port (P1) 208 and the fourth fabric port (P4) 228 for the NTO members 110 and 112 are coupled to the external switch fabric 104. In addition, the second fabric port (P2) 212 for the NTO supervisor is also coupled to the external switch fabric 104. During operation, the external switch fabric 104 is configured and managed by the NTO supervisor 102 using the filter control block 106 so that packets are forwarded to and from the NTO members 110 and 112 according to the filter configuration set by the filter control block 106.

As described above, the NTO supervisor 102 can be configured to include and/or be coupled to a user interface 108, such as a graphical user interface (GUI). This user interface 108 can further be configured to allow a user or operator to view, modify, adjust, and/or otherwise manage the unified NTO system through the NTO supervisor 102. For example, using the user interface 108, a user can identify and register NTO member systems, and/or this identification and registration can be done automatically by the NTO supervisor 102. For example, an identification and registration process could be initiated manually by a user through the user interface 108, or the NTO supervisor 102 can be configured to automatically identify and register NTOs connected to the unified NTO system on a periodic basis and/or when initiated by a user. Similarly, the NTO supervisor 102 can be configured to automatically identify filters for the NTOs connected to the unified NTO system on a periodic basis, or this filter identification process could be initiated by a user or performed manually be a user. Once defined or identified, filter rules can be pushed to the associated NTO members, as described further below. In addition, the NTO supervisor 102 can be configured to automatically configure ports for the NTOs connected to the unified NTO system on a periodic basis, or this port configuration process could be initiated by a user or performed manually be a user. Once defined, the port configuration information can be pushed to the associated NTO members, as described further below. If desired, the NTO members can also be configured to automatically inform the NTO supervisor 102 of its current filter rules and/or port configurations. The NTO supervisor 102 can then be utilized to adjust and/or further configure the filter rules and ports for the NTO members. Other variations could also be implemented, as desired.

Embodiments for configuration of the unified NTO system are now described with respect to FIGS. 4-7. FIG. 4 provides a block diagram related to NTO membership configuration. FIG. 5 provides a block diagram related to identification and configuration of filter rules for NTO members. FIG. 6 provides a block diagram related to configuration of communication ports for the NTO members. And FIG. 7 provides a process flow diagram for configuring a unified NTO system.

FIG. 4 is a block diagram of an embodiment 400 for NTO membership configuration by the NTO supervisor 102. During configuration, the NTO supervisor 102 utilizes the global NTO membership configuration block 130 to detect and register NTO members. As depicted, the NTO supervisor 102 sends out auto-discovery messages 402 and 412 that are received by the NTO members 110 and 112. The local NTO system provisioning and administration block 404 within the first NTO member (NTO1) 110 then responds to the auto-discovery message 402 by accessing its system profile information 406 and then providing NTO profile information 408 back to the NTO supervisor 102. Similarly, the local NTO system provisioning and administration block 414 within the second NTO member (NTO2) 112 responds to the auto-discovery message 412 by accessing its system profile information 416 and then providing NTO profile information 418 back to the NTO supervisor 102. The global NTO membership configuration block 130 within the NTO supervisor 102 then utilizes the system profile information 408 and 418 to register the NTOs 110 and 112 as members of the unified NTO system controlled by the NTO supervisor 102. Variations to this identification and registration of NTO members could also be implemented, as desired.

FIG. 5 is a block diagram of an embodiment 500 for NTO filter configuration by the NTO supervisor 102. During configuration, the NTO supervisor 102 utilizes the global NTO filter configuration block 132 to configure filter rules for the NTO members. As depicted, the NTO supervisor 102 pushes filter control messages 502 and 512 that are received by the NTO members 110 and 112. The local NTO system provisioning and administration block 404 within the first NTO member (NTO1) 110 then responds to the filter control messages 502 by setting its local filter rules 116 according to the filter control messages 502 sent by the NTO supervisor 102. Similarly, the local NTO system provisioning and administration block 414 within the second NTO member (NTO2) 112 responds to the filter control messages 512 by setting its local filter rules 118 according to the filter control messages 512 sent by the NTO supervisor 102. As described herein, by unifying the filter rules 116 and 118 to account for forwarding packets across multiple NTO members, the NTO members 110 and 112 become part of the unified NTO system that is controlled by the NTO supervisor 102. Variations to this identification and configuration of filters for the NTO members could also be implemented, as desired.

FIG. 6 is a block diagram of an embodiment 600 for NTO port configuration by the NTO supervisor 102. During configuration, the NTO supervisor 102 utilizes the global NTO port configuration block 134 to configure ports for the NTO members. As depicted, the NTO supervisor 102 pushes port control messages 602 and 612 that are received by the NTO members 110 and 112. The local NTO system provisioning and administration block 404 within the first NTO member (NTO1) 110 then responds to the port control messages 602 by setting its port configuration information 604 (e.g., ingress ports, egress ports, fabric ports) according to the port control messages 602 sent by the NTO supervisor 102. Similarly, the local NTO system provisioning and administration block 414 within the second NTO member (NTO2) 112 responds to the port control messages 612 by setting its port configuration information 614 (e.g., ingress ports, egress ports, fabric ports) according to the port control messages 612 sent by the NTO supervisor 102. As described herein, by unifying the port configurations according to the port configuration messages 602 and 612 to account for forwarding packets across multiple NTO members, the NTO members 110 and 112 become part of the unified NTO system that is controlled by the NTO supervisor 102. Variations to this identification and configuration of ports for the NTO members could also be implemented, as desired.

FIG. 7 is a process flow diagram of an embodiment 700 for configuration of a unified NTO system. In block 702, NTO members are identified. As described herein, this identification of NTO members can be implemented manually by a user, for example, through a user interface 108 coupled to the NTO supervisor 102 that allows the user to identify NTO devices and then include them as members within a unified NTO system. This identification of NTO members can also be implemented through an automatic detection process implemented by the NTO supervisor 102, where the NTO supervisor 102 detects the presence of connected NTO devices and includes them as members within a unified NTO system. In block 704, existing filters that are defined within the NTO members are determined by the NTO supervisor 102. In block 706, the NTO supervisor 102 then configures ports (e.g., source ports, destination ports, fabric ports) and filter rules for the NTO members and the NTO supervisor 102 to provide for forwarding of packets according to the filters identified for the NTO members. Next, in block 708, determination is made whether new filters are desired for the unified NTO system. If "YES," then flow passes to block 710 wherein new filter rules are defined for the desired new filters. As described herein, these filter rules determine how selected source packets are forwarded to one or more destination ports based upon packet contents. Advantageously, as described herein, a destination port can be located on a NTO member that is different from the NTO member where the source port is located. If the determination in block 708 is "NO," then flow passes to block 712 where the configuration of the unified NTO system ends. It is noted that the NTO system configuration process can be conducted periodically, if desired. Variations could also be implemented, as desired.

It is noted that the NTO supervisor 102 can be configured to utilize one or more tables to track NTO members and their related source ports, filter rules, destination ports, interconnect fabric ports, and/or other desired information. TABLE 1 below provides one example embodiment with respect to embodiment 200 in FIG. 2 for port information and filter information that can be stored and tracked by the NTO supervisor 102 as part of the filter control block 106.

TABLE 1

EXAMPLE PORT/FILTER INFORMATION TRACKED BY NTO SUPERVISOR

| Member ID | Port | Port Type | Filter | Associated Fabric Port |
|---|---|---|---|---|
| NTO1 | N1 | Source | F1 | P1 |
| NTO1 | T1 | Destination | F1 | NA |
| NTO1 | P1 | Interconnect | F1 | NA |
| NTO2 | T2 | Destination | F1 | NA |
| NTO2 | N2 | Source | F2 | NA |
| NTO2 | T2 | Destination | F2 | NA |
| NTO2 | P4 | Interconnect | F1 | NA |
| Supervisor | P2 | Interconnect | F1 | P3 |
| Supervisor | P3 | Interconnect | F1 | NA |

With respect to TABLE 1, it is assumed that the first filter (F1) 116 within the first NTO member (NTO1) 110 is configured to forward ingress packets received at the network port (N1) 204 to the tool port (T1) 206 within the first NTO member (NTO1) 110 and also to the tool port (T2) 226 within the second NTO member (NTO2) 112. As such, TABLE 1 shows the first network port (N1) 204 as a source port associated with the first filter (F1) 116 and interconnect fabric port (P1) 208. The first tool port (T1) 206 is listed as a destination port associated with the first filter (F1) 116, and the second tool port (T2) 226 is also listed as a destination port associated with the first filter (F1) 116. The first fabric port (P1) 208 is listed as an interconnect port associated with the first filter (F1) 116. With respect to the second filter (F2) 118 within the second NTO member (NTO2) 112, it is assumed that the second filter (F2) 118 is configured to forward ingress packets received at the network port (N2) 224 only to the tool port (T2) 226 within the second NTO member (NTO2) 112. As such, TABLE 1 shows the second network port (N2) 224 as a source port associated with the second filter (F2) 118. The second tool port (T2) 226 is listed as a destination port associated with the second filter (F2) 118. Further, the fourth fabric port (P4) 228 is listed as an interconnect port associated with the first filter (F1) 116, as the NTO supervisor 102 will be causing packets to be forwarded from the first NTO member (NTO1) 110 to the second NTO member (NTO2) 112 through this fourth fabric port (P4) 228. It is also noted that with respect to the fabric ports within the NTO supervisor 102, TABLE 1 shows that the second fabric port (P2) 212 is an interconnect port associated with the first filter (F1) 116 and interconnect fabric port (P3) 214. Further, the fourth fabric port (P4) 228 is listed as an interconnect port associated with the first filter (F1) 116. The NTO supervisor 102 uses the second (P2 and third (P3) interconnect fabric ports 212 and 214 to forward packets from the first NTO member (NTO1) 110 to the second NTO member (NTO2) 112. Other variations could also be implemented, as desired, for storing and tracking source/destination port, interconnection port, filters, and/or other desired information within the NTO supervisor 102.

It is noted that the NTO supervisor 102 can be further configured to utilize one or more tables to track NTO members and interconnections required for filter rules. TABLE 2 below provides one example embodiment with respect to embodiment 200 in FIG. 2 for filter rule information and related interconnections that can be stored and tracked by the NTO supervisor 102 as part of the filter control block 106.

TABLE 2

EXAMPLE INTERCONNECT INFORMATION TRACKED BY NTO SUPERVISOR FOR FILTERS

| Filter | Member ID | Filter Requirements | Fabric Ports Needed | Source Ports | Destination Ports |
|---|---|---|---|---|---|
| F1 | NTO1 | Forward packets to T1 and T2 | P1 on NTO1 P2, P3 on Supervisor P4 on NTO2 | NTO1 (N1) | NTO1 (T1) NTO2 (T2) |
| F2 | NTO2 | Forward packets to T2 | NA | NTO2 (N2) | NTO2 (T2) |
| F1 | Supervisor | Interconnect NTO1 and NTO2 | P2, P3 on Supervisor | Supervisor (P2) | Supervisor (P3) |

With respect to TABLE 2, it is again assumed that the first filter (F1) 116 and the second filter (F2) 118 are still forwarding packets in the same manner as with TABLE 1. The first filter (F1) 116 is listed as associated with the first NTO member (NTO1) 110 and as requiring packets to be forwarded to both the first tool port (T1) 206 on the first NTO member (NTO1) 110 and the second tool port (T2) 226 on the second NTO member (NTO2) 112. The fabric ports needed for interconnection are listed as the first fabric port (P1) 208, the second fabric port (P2) 212 on the NTO supervisor 102, the third fabric port (P3) 214 on the NTO supervisor 102, and the fourth fabric port (P4) 228 on the second NTO member (NTO2) 112. Further, source ports for the first filter (F1) 116 are listed as the first network port (N1) 204, and the destination ports for the first filter (F1) 116 are listed as the first tool port (T1) 206 and the second tool port (T2) 226. The second filter (F2) 118 is listed as associated with the second NTO member (NTO2) 112 and as requiring packets to be forwarded to the second tool port (T2) 226 on the second NTO member (NTO2) 112. As such, no fabric ports are needed for interconnection for the second filter (F2) 118. Further, source port for the second filter (F2) 118 is listed as the second network port (N2) 224, and the destination port for the second filter (F2) 118 is listed as the second tool port (T2) 226. Other variations could also be implemented, as desired, for storing and tracking filters, related interconnection requirements, and/or other desired information within the NTO supervisor 102. It is further noted that TABLE 1 and TABLE 2 could be combined into a single table, if desired, and different and/or additional tables could also be utilized, as desired.

FIG. 8 is a block diagram of an embodiment 800 for an NTO member, such as NTO member 110 and/or NTO member 112 described above. For the embodiment depicted, one or more ingress ports 802 receive source packets 801 from one or more network sources, such as may be provided by one or more network monitoring devices. The source ingress packets 801 are then provided to one or more ingress filter engines 804, which utilize filter rules to determine how to forward the ingress packets. For example, one or more VLAN (virtual local area network) tables 806 can be utilized that determine one or more destination ports (e.g., tool port or fabric port) for the ingress packets based upon VLAN data within the ingress packets. In addition, one or more L2 tables 808 can be utilized that determine one or more destination ports for the ingress packets based upon L2 data within the ingress packets. It is noted that the L2 data represents OSI (Open Systems Interconnect) Layer 2 information (e.g., data link layer), and it is noted that the L2 tables 808 can also store L2 multicast related information, if desired. Further, one or more L3 tables 810 can be utilized that determine one or more destination ports for the ingress packets based upon L3 data within the ingress packets. It is noted that the L3 data represents OSI Layer 3 information (e.g., network layer). Different and/or additional information and related tables could also be utilized to determine packet forwarding, if desired. Variations could also be implemented, as desired.

Once ingress packets are processed using the ingress filter engines 804 to determine the destination ports for the ingress packets, the ingress packets are provided to the switch fabric 805. The switch fabric 805 then forwards the packets as egress packets to the egress filter engines 818 associated with the egress ports 820 or to the interconnect fabric ports 812. As described herein the interconnect fabric ports 812 are utilized to relay packets between multiple NTO members within the unified NTO system managed by the NTO supervisor 102. The interconnect fabric ports 812 can be, for example, high speed interconnect ports included within the NTO member device 800. Egress packets received by the egress filter engines 818 are processed using egress filters, if any, and associated egress filter rules. The egress packets are then provided to one or more egress ports 820 based upon destination ports identified for the egress packets. The egress packets 822 are then provided to external devices, such as one or more network analysis tools. Egress packets received by the interconnect fabric ports 812 are forwarded as relayed egress packets 816 to the NTO supervisor 102, which in turn forwards each packet to the appropriate NTO member that has the destination port identified for the egress packet. The interconnect fabric ports 812 also receive relayed ingress packets 814 from the NTO supervisor 102 that originated from other NTO members. These relayed ingress packets 814 are then provided to the switch fabric 805, processed by the egress filter engines 818, and forwarded to the egress ports 820 depending upon the destination port for the packets. It is noted that the unified NTO system can be configured to rely primarily and/or solely upon the ingress filter engines 804 to determine how to forward ingress packets to destination ports (e.g., tool ports or fabric ports) for the unified NTO system. For such a configuration, the egress filter engines 818 would not be used or would play a small role in determining the particular egress port for processed packets. Other variations could also be implemented, as desired.

As described herein, therefore, unified NTO systems include a plurality of NTO members connected through interconnection fabric ports, such as high speed fabric ports (e.g., 1 Gbps, 10 Gbps, 100 Gbps). Advantageously, the unified NTO system can be managed as a single unit. For example, the unified NTO system can be configured to have a single IP (Internet Protocol) address within a network including the unified NTO system, if desired. The packet forwarding operations within the unified NTO system preferably rely upon the ingress filter engines 804 to determine how packets are forwarded within the unified NTO system. When a packet first enters the unified NTO system, the first ingress NTO member receiving the ingress packet is configured to make the forwarding decision and to forward the packet to the appropriate destination port or ports. These destination ports may include, for example, ports on the first ingress NTO member receiving the packet and/or other NTO members within the unified NTO system. For packets destined to remote NTO members, the packet will travel across an interconnect fabric port through the NTO supervisor device or a separate switch fabric device to the remote NTO member. As described herein, VLAN tables 806, L2 tables 808, L3 table 810, and/or other packet information can be used by ingress filter engines 804 to forward packets to appropriate destination ports. Further, as described herein, to configure and manage the filters within the unified NTO system, the NTO supervisor 102 can be configured store one or more tables having data used to implement filter rules for the NTO members of the unified NTO system. It is noted that if a filter is determined not to be valid, the NTO supervisor 102 can be configured to remove the associated filter rules from the NTO members. Further, after validation of a new filter, the NTO supervisor 102 can push the filter rules to the NTO members so that ingress packets are forwarded to the appropriate destination ports within the unified NTO system, as described herein. Variations can also be implemented, as desired.

It is noted that example embodiments for analyzing overlapping filters, determining filter rules for overlapping filters, applying filter rules to ingress filter engines and egress filter engines to forward ingress packets according to defined filters, and superset packet forwarding from ingress ports to egress ports are described in U.S. Pat. No. 8,018,943 and in U.S. Pat. No. 8,098,677, which is each incorporated herein by reference in its entirety. It is further noted that certain embodiments described within these patents use a two-stage approach to forward ingress packets, relying upon both ingress filter engines and egress filter engines to provide for packet forwarding based upon defined filters. It is again noted that the embodiments described herein preferably utilize only the ingress filter engines within the NTO member devices to determine how packets are forwarded, although egress filter engines could also be utilized if desired.

FIG. 9 is a block diagram of an embodiment 900 for a unified NTO system that includes multiple NTO supervisors. For the embodiment depicted, two NTO supervisors are provided within the unified NTO system. A first NTO supervisor 102 operates as the primary NTO supervisor, and a second NTO supervisor 902 operates as a secondary NTO supervisor. As depicted, a first NTO member (NTO1) 110, a second NTO member (NTO2) 112, and a third NTO member (NTO3) 904 are connected to the primary NTO supervisor 102, for example, using high speed interconnect fabric ports. In addition, a fourth NTO member (NTO4) 906, a fifth NTO member (NTO5) 908, and a sixth NTO member (NTO6) 910 are connected to the secondary NTO supervisor 902, for example, using high speed interconnect fabric ports. The primary NTO supervisor 102 and the secondary NTO supervisor 902 can also be connected together, for example, using high speed interconnect fabric ports. During configuration of the unified NTO system, the primary NTO supervisor 102 determines filter and port information for the NTO members. In particular, the primary NTO supervisor 102 can be configured to communicate directly with the NTO members 110, 112, and 904 that are directly connected to the primary NTO supervisor 102 to obtain and configure filter/port information for these NTO members. Further, the primary NTO supervisor 102 can be configured to communicate with the remote NTO members 906, 908, and 910 through the secondary NTO supervisor 902 to obtain and configure filter/port information for these remote NTO members. The primary NTO supervisor 102 can then configure and manage the directly connection NTO members 110, 112, and 904 as well as the remote NTO members 906, 908, and 910. Further, the primary NTO supervisor 102 can also configure and manage the secondary NTO supervisor 902, if desired. Through this configuration and management of the unified NTO system, the primary NTO supervisor 102 can cause ingress packets received by the unified NTO system to be forwarded across the entire unified NTO system according to filters defined for the various NTO member elements. Advantageously, therefore, the unified NTO system can use multiple NTO supervisors to further expand and scale a unified NTO system that is still managed and controlled as a single network element.

As described herein, the unified NTO system allows for packets received at a source port associated with one NTO member devices to be forwarded through the unified NTO system to a destination tool port associated with another NTO member within the unified system. Further, as described above one or more NTO supervisor devices can be utilized to manage and control the unified system and to configure filters and associated filter rules within the NTO member devices and/or NTO supervisor devices to provide for the desired packet forwarding within the unified NTO system. As also described above, forwarding tables (e.g., VLAN, L3, L2) and other techniques can be utilized to facilitate the forwarding of packets within the unified NTO system. For example, as described in further detail below, one or more techniques that can be utilized to facilitate packet forwarding within the unified NTO system include providing an ingress only forwarding architecture for the unified NTO system, using L3 tables for filter rule reduction, using filter truth tables for filter rule generation, using TCAM (ternary content addressable memory) forwarding tables for filter rule reduction, using VLAN and source/destination port ranges for improved efficiency, using logic reduction techniques, and/or using other desired techniques. Other variations could also be implemented and utilized, as desired, to manage and control packet forwarding within the unified NTO system.

With respect to using an ingress only forwarding architecture, the unified NTO system can be configured, if desired, such that all forwarding decisions for the unified NTO system are made at the first NTO member that receives the packet being forwarded. For forwarded data packets, the initial ingress NTO member of the unified NTO system for a packet makes the entire forwarding decision for the destination port based on the filter rules for its forwarding tables. The overall control of the unified NTO system, however, is still centralized using the one or more NTO supervisors. As described herein, the NTO supervisor maintains information to manage and configure the forwarding tables needed to implement filter rules for the entire unified NTO system. Thus, the initial ingress NTO member determines the destination port(s) for the packet, and the NTO supervisor manages the forwarding of that packet if the destination port is located on a different NTO member within the unified NTO system.

It is again noted, as described herein, that packet filters can be implemented using a variety of forwarding tables, including VLAN tables, L2 tables, L3 tables, L2 Multicast tables, and/or other desired tables. It is noted that L3 tables are typically used for Network Layer 3 routing. However, L3 tables can be utilized within the unified NTO system to reduce filter rules, if desired. In particular, the L3 tables can be used to generate class identifiers that are used in ingress TCAM forwarding tables for filtering. This technique saves space in the ingress TCAM forwarding tables as multiple L3 value/mask entries can share a single class identifier. Avoiding use of additional value/mask entries helps to eliminate rules for implementing filters. Advantageously, this technique can be utilized for to both IPv4 (Internet Protocol version 4) and IPv6 (Internet Protocol version 6).

Multiple layers of truth tables can also be utilized to reduce filter rules. In particular, through the use of multiple levels of truth tables, the number of filter rules required for correct forwarding can be reduced, thereby reducing filter rule storage requirements. If desired, a high-level truth table covering multiple filters and per-filter truth tables can be utilized. The high level truth table associates two or more filters with the forwarding port lists (PL) for the filters. The per-filter truth tables associate filter rules with a desired action for a particular filter.

TABLE 3 below is an example for a high level truth table covering two filters and a port list (PL1, PL2) for each filter that indicate the ports to which packets matching the filter rules are forwarded.

TABLE 3

EXAMPLE HIGH LEVEL TRUTH TABLE

| Filter1 | Filter2 | Action |
|---------|---------|--------|
| 0 | 0 | None |
| 0 | 1 | PL2 |
| 1 | 0 | PL1 |
| 1 | 1 | PL1, PL2 |

TABLE 4 below is an example for a per-filter truth table for a filter having two rules (R1, R2) where the rules are subject to a Boolean AND operation.

TABLE 4

EXAMPLE PER-FILTER TRUTH TABLE
(Boolean AND Operation)

| R1 | R2 | Action |
|----|----|--------|
| 0 | 0 | None |
| 0 | 1 | None |
| 1 | 0 | None |
| 1 | 1 | Forward |

TABLE 5 below is a per-filter truth table for a filter having two rules (R1, R2) where rules are subject to a Boolean OR operation.

TABLE 5

PER-FILTER TRUTH TABLE
(Boolean OR Operation)

| R1 | R2 | Action |
|----|----|--------|
| 0 | 0 | None |
| 0 | 1 | Forward |
| 1 | 0 | Forward |
| 1 | 1 | None |

Further, TCAM forwarding tables can be utilized for filter rule reduction. For example, VLAN class identifiers can be generated for a range of VLAN values rather than storing each VLAN value within ingress TCAM forwarding tables, thereby reducing the number of VLAN filter rules required to be stored. In addition, TCP (transmission control protocol) source and destination tables can also be utilized to define source/destination port ranges to reduce filter rules. Further, negative filter logic can be utilized in addition to or instead of positive filter logic to determine how packets are forwarded by the filter rules. Also, logic reduction or minimization techniques can also be utilized, such as an Espresso algorithm, to reduce digital logic utilized for implementing filter rules, if desired. Other variations and techniques could also be utilized, as desired.

It is noted that the operational blocks described herein can be implemented using hardware, software or a combination of hardware and software, as desired. In addition, integrated circuits, discrete circuits or a combination of discrete and integrated circuits can be used, as desired, that are configured to perform the functionality described. Further, programmable integrated circuitry can also be used, such as FPGAs (field programmable gate arrays), ASICs (application specific integrated circuits), and/or other programmable integrated circuitry. In addition, one or more processors running software or firmware could also be used, as desired. For example, computer readable instructions embodied in a tangible medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, programmable circuitry (e.g., FPGAs), and/or processors to perform the processes, functions, and capabilities described herein. It is further understood, therefore, that one or more of the tasks, functions, or methodologies described herein may be implemented, for example, as software or firmware and/or other instructions embodied in one or more non-transitory tangible computer readable mediums that are executed by a CPU, controller, microcontroller, processor, microprocessor, or other suitable processing circuitry.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A system for unified operation of multiple network tool optimizer (NTO) devices, comprising:
   a first network tool optimizer (NTO) member device comprising at least one source port and at least one interconnect port;
   a second NTO member device comprising at least one destination port and at least one interconnect port;
   switch fabric circuitry coupled to the interconnect ports for the first and second NTO member devices;
   an NTO supervisor device configured to control the switch fabric circuitry to receive packets from the first NTO member device and to forward the received packets to the second NTO member device, the packets being associated with the at least one source port on the first NTO member device and being output to the at least one destination port on the second NTO member device;
   wherein the NTO supervisor device is further configured to manage the NTO member devices and the switch fabric circuitry to form a unified NTO system; and
   at least one secondary NTO supervisor device coupled to the NTO supervisor device and managed by the NTO supervisor device to extend the unified NTO system, the secondary NTO supervisor device being configured to control additional switch fabric circuitry to receive packets from the NTO supervisor device and to forward the received packets to one or more additional NTO member devices coupled to the secondary NTO supervisor device.

2. The system of claim 1, further comprising a first packet filter associated with the first NTO member device having filter rules that determine how packets are forwarded within the first NTO member device, and a second packet filter associated with the second NTO member device having filter rules that determine how packets are forwarded within the second NTO member device.

3. The system of claim 2, wherein the NTO supervisor device is further configured to manage the filter rules for the first packet filter and the second packet filter.

4. The system of claim 1, wherein the switch fabric circuitry is internal to the NTO supervisor device, and the NTO supervisor device comprises a plurality of interconnect ports coupled to the interconnect ports for the first and second NTO member devices.

5. The system of claim 1, wherein the switch fabric circuitry is external to the NTO supervisor device.

6. The system of claim 1, wherein the NTO supervisor device is configured to provide a user interface, the user interface being configured to allow a user to define one or more packet filters for the unified NTO system.

7. The system of claim 1, wherein the NTO supervisor device is further configured to automatically detect an NTO device coupled within a network including the NTO supervisor and to register the NTO device as a member device within the unified NTO system.

8. The system of claim 1, wherein the NTO supervisor device is further configured to generate filter rules for one or more NTO member devices within the unified NTO system and to push the filter rules to the one or more NTO member devices.

9. The system of claim 1, wherein the NTO supervisor device is further configured to generate port configurations for one or more NTO member devices within the unified NTO system and to push the port configurations to the one or more NTO member devices.

10. The system of claim 1, wherein the NTO member devices are configured to automatically provide configuration information to the NTO supervisor device.

11. The system of claim 1, wherein the NTO supervisor device is further configured to store configuration information associated with the NTO member devices and to use the stored configuration information to at least in part determine how packets are forwarded within the unified NTO system between the NTO member devices.

12. The system of claim 1, wherein at least one of a VLAN (virtual local area network) table, an L3 (network layer 3) table, or an L2 (network layer 2) table is utilized to define a packet filter within the first and second NTO member devices.

13. A system for unified operation of multiple network tool optimizer (NTO) devices, comprising:
   a first network tool optimizer (NTO) member device comprising at least one source port and at least one interconnect port;
   a second NTO member device comprising at least one destination port and at least one interconnect port;
   switch fabric circuitry coupled to the interconnect ports for the first and second NTO member devices; and
   an NTO supervisor device configured to control the switch fabric circuitry to receive packets from the first NTO member device and to forward the received packets to the second NTO member device, the packets being associated with the at least one source port on the first NTO member device and being output to the at least one destination port on the second NTO member device;
   wherein the NTO supervisor device is further configured to manage the NTO member devices and the switch fabric circuitry to form a unified NTO system; and
   wherein the at least one destination port is determined only by one or more packet filters defined within the first NTO member device as an initial ingress NTO member device for the packets associated with the at least one source port.

14. A method for unified operation of multiple network tool optimizer (NTO) devices, comprising:
   receiving packets with a first network tool optimizer (NTO) device;
   receiving packets with a second network tool optimizer (NTO) device;
   receiving with switch fabric circuitry a plurality of packets from the first NTO member device, the plurality of packets being associated with at least one source port on the first NTO member device;
   utilizing the switch fabric circuitry to forward the plurality of packets to the second NTO member device;
   outputting the plurality of packets to at least one destination port on the second NTO member device;
   controlling the switch fabric circuitry using an NTO supervisor device;
   managing the NTO member devices and the switch fabric circuitry with the NTO supervisor device to form a unified NTO system;
   managing a secondary NTO supervisor device with the NTO supervisor device to extend the unified NTO system; and
   utilizing the secondary NTO supervisor device to receive packets from the first NTO supervisor device and to forward the received packets to one or more additional NTO member devices coupled to the secondary NTO supervisor device.

15. The method of claim 14, further comprising using filter rules for a first packet filter within the first NTO member device to determine how packets are forwarded within the first NTO member device and using filter rules for a second packet filter within the second NTO member device to determine how packets are forwarded within the second NTO member device.

16. The method of claim 15, further comprising utilizing the NTO supervisor device to manage the filter rules for the first packet filter and the second packet filter.

17. The method of claim 14, further comprising utilizing switch fabric circuitry internal to the NTO supervisor device to forward packets from the first NTO device to the second NTO device.

18. The method of claim 14, further comprising utilizing switch fabric circuitry external to the NTO supervisor device to forward packets from the first NTO device to the second NTO device.

19. The method of claim 14, further comprising allowing a user to define one or more packet filters for the unified NTO system through a user interface for the NTO supervisor device.

20. The method of claim 14, further comprising utilizing the NTO supervisor device to automatically detect an NTO device coupled within a network including the NTO supervisor and to register the NTO device as member device within the NTO system.

21. The method of claim 14, further comprising utilizing the NTO supervisor device to generate filter rules for one or more NTO member devices within the unified NTO system and to push the filter rules to the one or more NTO member devices.

22. The method of claim 14, further comprising utilizing the NTO supervisor device to generate port configurations for one or more NTO member devices within the unified NTO system and to push the port configurations to the one or more NTO member devices.

23. The method of claim 14, further comprising automatically providing configuration information from the NTO member devices to the NTO supervisor device.

24. The method of claim 14, further comprising storing configuration information associated with the NTO member devices and using the stored configuration information to at least in part determine how packets are forwarded within the unified NTO system between the NTO member devices.

25. The method of claim 14, further comprising utilizing at least one of a VLAN (virtual local area network) table, an L3 (network layer 3) table, or an L2 (network layer 2) table to define a packet filter within the first and second NTO member devices.

26. A method for unified operation of multiple network tool optimizer (NTO) devices, comprising:
    receiving packets with a first network tool optimizer (NTO) device;
    receiving packets with a second network tool optimizer (NTO) device;
    receiving with switch fabric circuitry a plurality of packets from the first NTO member device, the plurality of packets being associated with at least one source port on the first NTO member device;
    utilizing the switch fabric circuitry to forward the plurality of packets to the second NTO member device;
    outputting the plurality of packets to at least one destination port on the second NTO member device;
    controlling the switch fabric circuitry using an NTO supervisor device;
    managing the NTO member devices and the switch fabric circuitry with the NTO supervisor device to form a unified NTO system; and
    determining the at least one destination port based only upon one or more packet filters defined within the first NTO member device as an initial ingress NTO member device for the packets associated with the at least one source port.

\* \* \* \* \*